(12) United States Patent
Schierbeek

(10) Patent No.: US 9,587,942 B2
(45) Date of Patent: Mar. 7, 2017

(54) VEHICLE COMPASS SYSTEM WITH HEATED WINDSHIELD COMPENSATION

(71) Applicant: MAGNA MIRRORS OF AMERICA, INC., Holland, MI (US)

(72) Inventor: Kenneth L. Schierbeek, Zeeland, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 155 days.

(21) Appl. No.: 14/674,396

(22) Filed: Mar. 31, 2015

(65) Prior Publication Data

US 2015/0276403 A1 Oct. 1, 2015

Related U.S. Application Data

(60) Provisional application No. 61/973,402, filed on Apr. 1, 2014.

(51) Int. Cl.
| | | |
|---|---|---|
| *G01C 9/26* | (2006.01) | |
| *G01C 17/38* | (2006.01) | |
| *B60R 1/12* | (2006.01) | |
| *H05B 1/02* | (2006.01) | |
| *G01C 17/28* | (2006.01) | |

(52) U.S. Cl.
CPC ............... *G01C 17/38* (2013.01); *B60R 1/12* (2013.01); *G01C 17/28* (2013.01); *H05B 1/0236* (2013.01); *B60R 2001/1215* (2013.01)

(58) Field of Classification Search
CPC .......... G01C 17/38; G01C 17/28; B60R 1/12; B60R 2001/1215
USPC ....................................... 33/354, 355 R, 356
See application file for complete search history.

(56) References Cited

U.S. PATENT DOCUMENTS

| | | | |
|---|---|---|---|
| 4,546,551 A | | 10/1985 | Franks |
| 4,862,594 A | | 9/1989 | Schierbeek et al. |
| 4,937,945 A | | 7/1990 | Schofield et al. |
| 4,953,305 A | | 9/1990 | Van Lente et al. |
| 5,131,154 A | | 7/1992 | Schierbeek et al. |
| 5,255,442 A | | 10/1993 | Schierbeek et al. |
| 5,576,687 A | | 11/1996 | Blank et al. |
| 5,632,092 A | * | 5/1997 | Blank ................... B60K 35/00 324/252 |

(Continued)

*Primary Examiner* — G. Bradley Bennett
(74) *Attorney, Agent, or Firm* — Gardner, Linn, Burkhart & Flory, LLP

(57) ABSTRACT

A compass system for a vehicle includes a compass sensor and compass circuitry. The compass sensor is disposed at or near an interior heated surface of a windshield of a vehicle equipped with the compass system. The compass circuitry, responsive to an output of the compass sensor indicative of sensed magnetic signals or fields, is operable to determine a directional heading of the vehicle. The compass circuitry is operable to determine a magnetic signature generated by a heating element that heats the interior heated surface of the windshield when the heating element is powered. The compass circuitry, responsive to a determination that the heating element is powered, is operable to compensate the sensed magnetic signals to determine the vehicle directional heading. The compensation is derived from the determined magnetic signature. The compass circuitry may compensate the sensed magnetic signals by applying an offset derived from the determined magnetic signature.

20 Claims, 2 Drawing Sheets

(56) References Cited

U.S. PATENT DOCUMENTS

| | | | |
|---|---|---|---|
| 5,677,851 A | 10/1997 | Kingdon et al. | |
| 5,699,044 A | 12/1997 | Van Lente et al. | |
| 5,708,410 A | 1/1998 | Blank et al. | |
| 5,737,226 A | 4/1998 | Olson et al. | |
| 5,802,727 A | 9/1998 | Blank et al. | |
| 5,878,370 A | 3/1999 | Olson | |
| 5,924,212 A | 7/1999 | Domanski | |
| 6,087,953 A | 7/2000 | DeLine et al. | |
| 6,140,933 A | 10/2000 | Bugno et al. | |
| 6,173,508 B1 | 1/2001 | Strohmeyer, Jr. et al. | |
| 6,222,460 B1 | 4/2001 | DeLine et al. | |
| 6,326,613 B1 | 12/2001 | Heslin et al. | |
| 6,513,252 B1* | 2/2003 | Schierbeek | G01C 17/38 324/244 |
| 6,642,851 B2 | 11/2003 | Deline et al. | |
| 6,824,281 B2 | 11/2004 | Schofield et al. | |
| 6,928,366 B2 | 8/2005 | Ockerse et al. | |
| 7,004,593 B2 | 2/2006 | Weller et al. | |
| 7,149,627 B2 | 12/2006 | Ockerse et al. | |
| 7,249,860 B2 | 7/2007 | Kulas et al. | |
| 7,289,037 B2 | 10/2007 | Uken et al. | |
| 7,329,013 B2 | 2/2008 | Blank et al. | |
| 7,370,983 B2 | 5/2008 | DeWind et al. | |
| 7,480,149 B2 | 1/2009 | DeWard et al. | |
| 7,815,326 B2 | 10/2010 | Blank et al. | |
| 7,965,336 B2 | 6/2011 | Bingle et al. | |
| 2004/0032675 A1* | 2/2004 | Weller | B60R 1/12 359/872 |
| 2005/0172504 A1 | 8/2005 | Ohm et al. | |
| 2006/0061008 A1 | 3/2006 | Karner et al. | |
| 2006/0132939 A1* | 6/2006 | Blank | B60R 1/12 359/838 |
| 2007/0288166 A1* | 12/2007 | Ockerse | G01C 17/28 701/530 |
| 2009/0093981 A1* | 4/2009 | Withanawasam | G01C 17/38 702/93 |
| 2013/0242099 A1* | 9/2013 | Sauer | H04N 5/2257 348/148 |
| 2015/0033567 A1* | 2/2015 | Jones | F41G 3/32 33/286 |
| 2015/0233714 A1* | 8/2015 | Kim | G01C 17/30 33/356 |

\* cited by examiner

VEHICLE COMPASS SYSTEM WITH HEATED WINDSHIELD COMPENSATION

CROSS REFERENCE TO RELATED APPLICATION

The present application claims the filing benefits of U.S. provisional application Ser. No. 61/973,402, filed Apr. 1, 2014, which is hereby incorporated herein by reference in its entirety.

FIELD OF THE INVENTION

The present invention relates generally to the field of compass systems for vehicles.

BACKGROUND OF THE INVENTION

It is known to provide a compass system for a vehicle that is operable to determine a directional heading of the vehicle. For the compass system to operate properly in a vehicle, a calibration procedure is performed to identify the vehicle magnetic offset that distorts the true earth's magnetic field value. Most of the magnetic offset is produced by the vehicle's sheet metal and structural components, especially those located in close proximity to the compass sensor. This offset field represents a static magnetic vector that is identified and mathematically nullified during a normal calibration procedure. Normal calibration can be accomplished by deliberately driving in a circle to quickly acquire the data, or waiting for the compass to gather the needed data during normal driving activities.

SUMMARY OF THE INVENTION

The present invention provides a compass system and compensation method that compensates the compass when a heated windshield or heating element at a windshield is operated. The system may determine a magnetic signature or magnetic field signature that is generated by the heated windshield when activated, and may determine a set of compensation values that are applied to the compass system or output when the heated windshield is activated and not applied when the heated windshield is not activated or powered. The system may determine fluctuations in the electrical current flow through the heated windshield (such as due to battery voltage fluctuations, temperature changes and/or the like), and may adjust the compensation values accordingly.

According to an aspect of the present invention, a compass system for a vehicle includes a compass sensor disposed at or near an interior heated region or surface of a windshield of a vehicle equipped with said compass system. The interior heated region or surface of the windshield (such as a localized region or substantially the entire windshield) has a heating element disposed thereat that is heated by an electrically resistive material of the heating element passing an applied electric current when the heating element is powered. The compass system includes compass circuitry, which, responsive to an output of the compass sensor that is indicative of sensed magnetic signals or fields sensed by the compass sensor, is operable to determine a vehicle heading of the equipped vehicle. The compass circuitry is operable to determine a magnetic signature generated by the heating element when the heating element is powered. The compass circuitry, responsive to a determination that the heating element is powered, is operable to compensate for the magnetic signature generated by the heating element to determine the vehicle directional heading, with the compensation being derived from the determined magnetic signature.

For example, the compass circuitry, responsive to an input indicative of the heating element being powered, may determine a change in the magnetic signals and determine an amount of magnetic shift that the heating element current generates, and the compensation may thus be derived from the determined amount of magnetic shift. The compass circuitry thus may apply a compensation to offset the determined magnetic signature of the heating element.

Optionally, the compass circuitry may be operable to adjust the compensation or offset to accommodate variances in current flow through the electrically resistive material of the heating element when the heating element is powered. The compass circuitry thus may adjust the compensation or offset responsive, at least in part, to at least one of (i) current flow through the electrically resistive material of the heating element when the heating element is powered, (ii) vehicle battery voltage fluctuation when the heating element is powered, (iii) temperature at or near the windshield and (iv) vehicle speed.

These and other objects, advantages, purposes and features of the present invention will become apparent upon review of the following specification in conjunction with the drawings.

DESCRIPTION OF THE PREFERRED EMBODIMENTS

Figure 1:
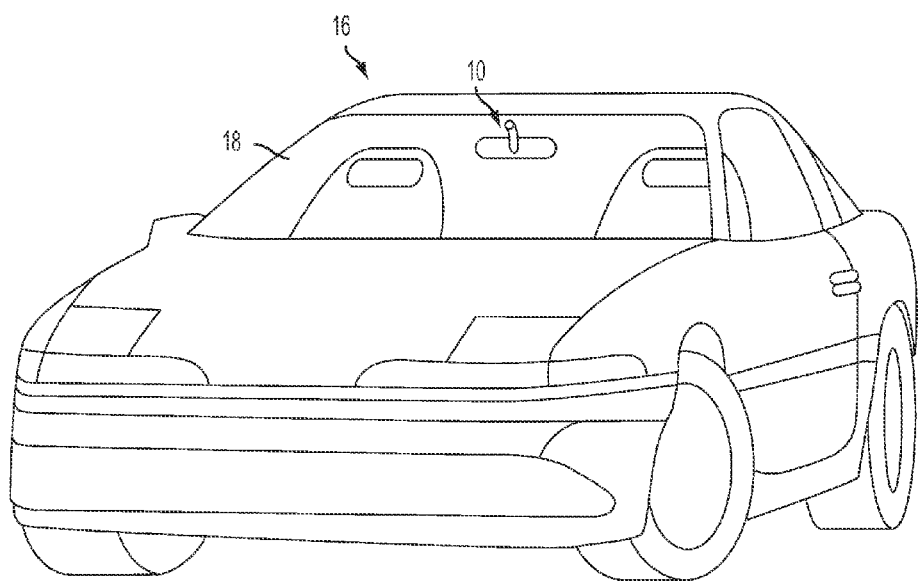
FIG. 1 is a perspective view of a vehicle having a compass system in accordance with the present invention.
Figure 2:
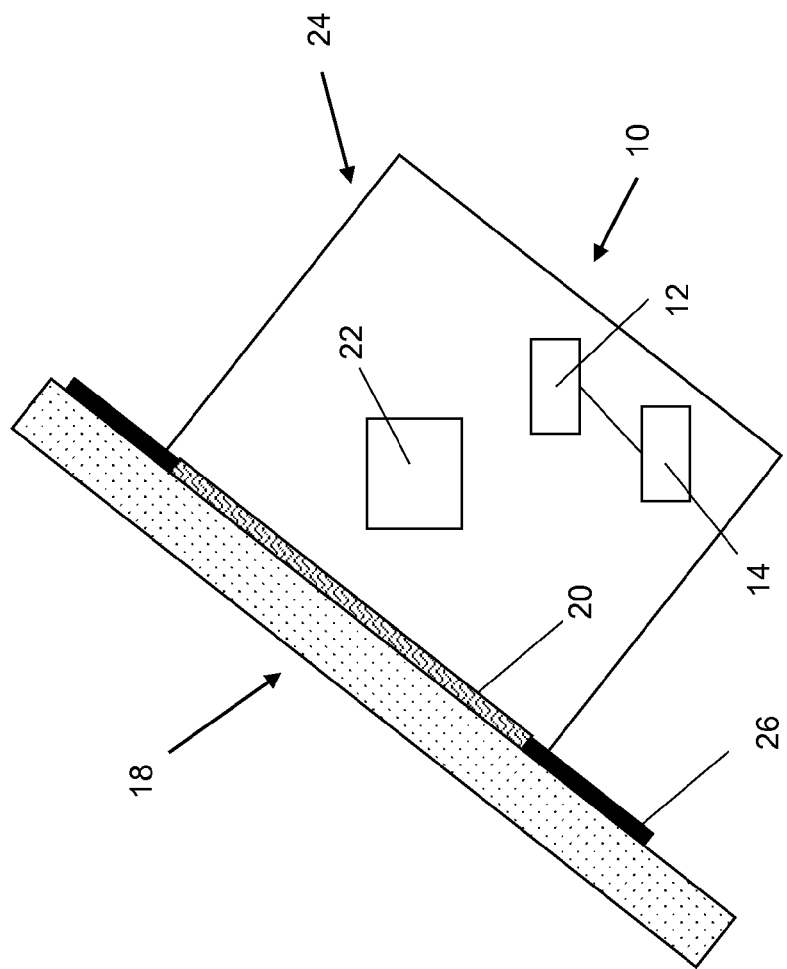
FIG. 2 is a schematic showing the compass system of the present invention.

Referring now to the drawings and the illustrative embodiments depicted therein, a compass system 10 (such as one or more magneto-responsive sensors 12 and associated circuitry 14 including software or firmware algorithms and the like) may be provided at an interior rearview mirror assembly of a vehicle 16 and is operable to determine a directional heading of the vehicle (FIGS. 1 and 2). The vehicle 16 includes a heated windshield 18 that is operable to generate heat at the windshield to defrost or defog or de-ice the windshield. For example, and such as can be seen with reference to FIG. 2, a surface or region of the windshield 18 may be heated by energizing or electrically powering a heating element 20, such as an electrically conductive transparent coating or trace at the windshield surface to generate heat at the windshield surface, whereby the electrically resistive coating or layer or element heats when an electrical current is passed through or across the coating or layer or element.

The heated windshield may comprise a windshield that has substantially its entire surface heated when powered or a windshield that has a localized region or surface portion of the windshield heated when powered. For example, modern vehicles often are equipped with a forward facing camera 22 (FIG. 2) located close to the interior rearview mirror assembly at the upper central windshield area (such as in a windshield electronics module or camera module 24 or the like), with the camera viewing through a transparent opening or window established in a blackout layer or frit 26 (such as by utilizing aspects of the systems described in U.S. Pat.

Nos. 6,824,281 and/or 6,326,613, which are hereby incorporated herein by reference in their entireties). Localized heating of the zone or region, and in particular of the window or aperture that the forward facing camera views through, is often provided such as by conductive traces (such as by fired silver frit layers or the like) or by other means such as transparent electrically conductive coatings (such as ITO or tin oxide layers or the like) or electrically conductive thin metal wire mesh or the like established at a surface (such as the interior surface) of the windshield at the local zone or region and not at the rest of the windshield. Such a heated windshield, when activated, can affect the performance of a compass sensor or circuitry disposed at or near the localized heating region. Optionally, the conductive traces or coatings or mesh or the like may be established at substantially the entirety of the surface of the heated windshield, or at a larger region that encompasses a portion of the windshield viewed through by the driver or passenger, depending on the particular application.

Electrical equipment in the vehicle can produce a magnetic offset based on the amount of current draw in wiring that is in the general proximity of the compass sensor. Usually a few amps or less doesn't cause enough of disturbance to substantially impact the accuracy of the compass, but higher current values can cause problems. A heated windshield with current draws that exceed 30 or 40 amps represents a very large magnetic disturbance that can generate a field strength value that is several times the earth's magnetic field. This value is dependent on the current draw of the heated windshield. A preferred way to provide enhanced accuracy during the defrost operation is to monitor the current draw of the windshield. This would then correct for or accommodate all variables that cause the current draw to change.

If monitoring the current draw is not possible or not feasible, then the system may monitor the basis of current draw, which is voltage and resistance. Because the heated windshield is powered by the vehicle's 12 volt electrical system, it can be determined that voltage fluctuations occur based on engine RPM and the electrical load produced by the other vehicle systems being powered at any given time (such as, for example, head lights, heated seats, rear window defrost and/or the like). Although monitoring voltage directly across the windshield would be ideal, it is likely that monitoring the battery (or ignition) voltage will provide a reasonable representation of the voltage variations that also occur across the windshield.

The electrical resistance of the windshield most likely cannot be directly measured in the vehicle. It can be assumed that there are significant variances from part to part that need to be accounted for. It has also been identified that the resistance changes with a change of temperature. As the temperature of the windshield increases, the resistance of the windshield also increases. All of these variances have an effect on the windshield current draw, which is correlated to the magnitude of the magnetic offset produced. These variations will impact the accuracy of the compass during operation of the heated windshield if they are not measured and taken into account.

Also, the routing of the wires that provide power to the windshield can also contribute to differences in the measured magnetic field projected when the windshield is activated. Because the compass sensor is located in the rearview mirror, the close proximity to the center position power feed at the top of the windshield results in strong sensitivity to the wire routing and positioning along the roof line.

Thus, there are two aspects to consider in dealing with the magnetic disturbances that are produced by a heated windshield.

According to an aspect of the present invention, because each vehicle has a unique magnetic signature generated by the heated windshield, a special calibration event may be provided to identify and correct for this disturbance. This could be accomplished by a second set of vehicle compensation values collected while the heated windshield is active, or more preferably may be done by identifying the vector and magnitude of this disturbance.

According to another aspect of the present invention, the compensation values or magnetic signature may be adjusted or modified to correct for fluctuations in the electrical current flow through the heated windshield (such as due to, for example, the battery voltage and/or temperature of the windshield and/or the like).

Expanding on the first aspect of the present invention, the compensation for the heated windshield may comprise a special one-time event or more preferably an on-going procedure that happens automatically without the need for dealer or driver input and the accompanying special driving instructions. The on-going approach will also automatically adapt to elements or situations or things that will change the magnetic signature of the windshield, such as a crack or damage to the glass that affects the resistance of the windshield, or possibly age related changes to the electrical resistance of the windshield.

In such a compass system, this calibration or compensation is accomplished by monitoring the heated windshield activation signal in the LIN message provided to the compass circuitry or mirror compass (such as to compass circuitry disposed at or in an interior rearview mirror assembly of the vehicle or at or in a module disposed at the windshield and at or near an interior rearview mirror assembly). The compass circuitry or system would continually retain a short history of magnetic sensor values. When the heated windshield activation signal is switched from off to on, the compass circuitry or system (responsive to a signal indicative of actuation of the heated windshield) would monitor the magnetic signals sensed by the magneto-responsive sensor and look for the change in the magnetic signals and identify the amount of magnetic shift that the windshield current generates. Preferably, the vehicle speed information is available to determine the suitability of using the detected deviation in the magnetic signal to compensate for the heated windshield offset. Alternatively, the stability of the signal before and after the activation event would be used to qualify or validate the observed change. Preferably, both methods would be utilized to determine the appropriateness of using this event (switching on the heated windshield) to update the heated windshield compensation values. If the event (switching on the heated windshield) produces an appropriate value or change, the new compensation value is stored and used to compensate for the shift in the magnetic signals when the heated windshield is activated. If this event does not produce an appropriate value, the last valid value stored in non-volatile memory is used for the compensation value.

Expanding on the second aspect of the present invention, to correct for variances in current flow through the windshield, the actual windshield current may be monitored and vector or axis magnitude adjustments may be made to the windshield offset values in real time as they occur. If direct windshield current flow monitoring is not available, then monitoring battery voltage, temperature and vehicle speed can be used to approximate the current flow changes through the windshield. In order to compensate for the effects of these variables, a baseline may be determined when the magnetic calibration data is collected.

Thus, not only are the magnetic offset values for each axis stored, the windshield current (if available), or battery voltage, and temperature may be stored that were present at the time of magnetic sampling. Any deviations from these values would require mathematical corrections to the windshield offset. Additionally, the longer the heated windshield is powered, the hotter it gets (maximum rise is about 15 degrees C. or thereabouts), plus the effect of vehicle speed on the rate of glass temperature rise and the maximum rise value can also be factored into correction calculations. Monitoring the outside temperature is more important than monitoring the inside temp, but monitoring both inside and outside temperatures may provide the best correlation to the temperature of the glass windshield.

Thus, an interior rearview mirror assembly or accessory module or the like (disposed at or near a heated windshield of a vehicle) may include a compass system, such as a compass sensor or sensors, compass circuitry and a compass display. The compass system may comprise any suitable compass sensors and processors, such as of the types described in U.S. Pat. Nos. 5,924,212; 4,862,594; 4,937,945; 5,131,154; 5,255,442 and/or 5,632,092 (which are hereby incorporated herein by reference in their entireties), and may include any other accessory or circuitry or the like. User inputs may also or otherwise function to activate and deactivate a display or function or accessory, and/or may activate/deactivate and/or commence a calibration or compensation of a compass system of the mirror assembly and/or vehicle.

The compass system is operable to sense a magnetic field at the vehicle and to determine a directional heading of the vehicle. The compass system offsets the sensed magnetic field (such as by applying a calibration or correction or compensation to the outputs of the compass sensors or to a determined directional heading or the like) by an offset amount or correction factor when the heated windshield is activated. The compass system may determine the change in magnetic field due to actuation of the heated windshield by monitoring the magnetic field when the heated windshield is switched from on to off or from off to on. If the determined shift in magnetic field is determined to be due to the heated windshield (and not due to other factors that may influence the shift in magnetic field, such as temperatures and vehicle speed and the like), the system uses that determined shift to compensate the sensed magnetic field when the heated windshield is activated in order to provide an enhanced determination of the directional heading of the vehicle. Optionally, the system may monitor the actual windshield current (the current flowing through or across the windshield when the heated windshield is activated) and vector or axis magnitude adjustments may be made to the windshield offset values in real time as they occur. Optionally, the system may monitor the vehicle battery voltage, temperature (outside temperature and/or inside temperature at or near the windshield) and vehicle speed to approximate the current flow changes through the windshield when the heated windshield is actuated.

The compass system may include compass sensors and circuitry within the mirror assembly or within a compass pod or module at or near or associated with the mirror assembly. Such a compass sensor and circuitry for the compass system that detects and displays the vehicle directional heading to a driver of the vehicle may comprise any suitable compass sensor and/or circuitry, such as a compass system and compass circuitry that utilizes aspects of the compass systems described in U.S. Pat. Nos. 7,370,983; 7,329,013; 7,289,037; 7,249,860; 7,004,593; 6,928,366; 6,642,851; 6,140,933; 4,546,551; 4,862,594; 4,937,945; 5,699,044; 4,953,305; 5,131,154; 5,255,442; 5,576,687; 5,632,092; 5,677,851; 5,708,410; 5,737,226; 5,802,727; 5,878,370; 5,924,212; 6,087,953; 6,173,508; 6,222,460 and/or 6,513,252, and/or European patent application, published Oct. 11, 2000 under Publication No. EP 0 1043566, and/or U.S. Pat. Pub. No. US-2006-0061008, which are all hereby incorporated herein by reference in their entireties.

The compass circuitry may include compass sensors, such as a magneto-responsive sensor, such as a magneto-resistive sensor, a magneto-capacitive sensor, a Hall sensor, a magneto-inductive sensor, a flux-gate sensor or the like. For example, the compass sensor or sensors may comprise a pair of magneto-responsive sensor elements arranged generally orthogonally to one another. Optionally, an integrated automotive "compass-on-a-chip" may be disposed in a cavity of the mounting base of the mirror (or within the mirror housing or in an attachment to the mirror mount or elsewhere within the mirror assembly such as to the rear of the video screen or to the rear of the mirror reflective element) and may comprise at least two sensor elements (such as magneto-responsive sensor elements, or a Hall effect sensor or multiple Hall effect sensors), associated A/D and D/A converters, associated microprocessor(s) and memory, associated signal processing and filtering, associated display driver and associated LIN/CAN BUS interface and the like, all (or a sub-set thereof) created or disposed or commonly established onto a semiconductor chip surface/substrate or silicon substrate, such as utilizing CMOS technology and/or fabrication techniques as known in the semiconductor manufacturing arts, and constituting an application specific integrated chip ("ASIC"), such as utilizing principles described in U.S. Pat. Nos. 7,815,326; 7,004,593; 7,329,013 and/or 7,370,983, and/or U.S. Pat. Pub. No. US-2006-0061008, which are hereby incorporated herein by reference in their entireties, and/or such as by utilizing aspects of an EC driver-on-a-chip such as described in U.S. Pat. No. 7,480,149, which is hereby incorporated herein by reference in its entirety.

The mirror assembly or compass mirror may comprise a prismatic mirror assembly or may comprise an electro-optic or electrochromic mirror assembly that includes an electro-optic or electrochromic reflective element. The electrochromic mirror element of the electrochromic mirror assembly may utilize the principles disclosed in commonly assigned U.S. Pat. Nos. 8,503,061; 7,274,501; 7,255,451; 7,195,381; 7,184,190; 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, which are hereby incorporated herein by reference in their entireties.

Optionally, the mirror assembly may comprise a prismatic reflective element, which may be mounted or attached at an interior portion of a vehicle (such as at an interior surface of the vehicle windshield) via the mounting means described above, and the reflective element may be toggled or flipped or adjusted between its daytime reflectivity position and its nighttime reflectivity position via any suitable toggle means, such as by utilizing aspects of the mirror assemblies described in U.S. Pat. Nos. 6,318,870 and/or 7,249,860, and/or U.S. Publication No. US-2010-0085653, which are hereby incorporated herein by reference in their entireties. Optionally, for example, the prismatic mirror assembly may utilize aspects of the mirror assemblies described in U.S. Pat. Nos. 7,289,037; 7,249,860; 6,318,870; 6,598,980; 5,327,288; 4,948,242; 4,826,289; 4,436,371 and/or 4,435,042, which are hereby incorporated herein by reference in their entireties. Optionally, the prismatic reflective element may comprise a conventional prismatic reflective element or prism or may comprise a prismatic reflective element of the types described in U.S. Pat. Nos. 7,420,756; 7,289,037; 7,274,501; 7,249,860; 7,338,177 and/or 7,255,451, which are all hereby incorporated herein by reference in their entireties, without affecting the scope of the present invention. A variety of mirror accessories and constructions are known in the art, such as those disclosed in U.S. Pat. Nos. 5,555,136; 5,582,383; 5,680,263; 5,984,482; 6,227,675; 6,229,319 and/or 6,315,421 (which are hereby incorporated herein by reference in their entireties), that can benefit from the present invention.

Optionally, the interior rearview mirror assembly or compass mirror may include compass circuitry and/or other circuitry therein (such as at a printed circuit board or the like disposed within the mirror casing), and electrical connection to the circuitry may be made via an electrical lead or connector of a wiring harness of the vehicle. Optionally, the electrical connector may be received through the mirror casing and through an aperture established through the toggle element, such as by utilizing aspects of the mirror assemblies described in U.S. Pat. No. 5,798,688 and/or U.S. Publication No. US-2010-0085653, which are hereby incorporated herein by reference in their entireties.

The mirror assembly may include user actuatable inputs operable to control any of the accessories of or associated with the mirror assembly and/or an accessory module or the like. For example, the mirror assembly may include touch sensitive elements or touch sensors or proximity sensors, such as the types of touch sensitive elements described in U.S. Pat. Nos. 5,594,222; 6,001,486; 6,310,611; 6,320,282; 6,627,918; 7,224,324 and/or 7,253,723, and/or International Publication Nos. WO 2012/051500 and/or WO 2013/071070, which are hereby incorporated herein by reference in their entireties, or such as proximity sensors of the types described in U.S. Pat. Nos. 7,224,324; 7,249,860 and/or 7,446,924, and/or International Publication No. WO 2004/058540, which are hereby incorporated herein by reference in their entireties, or such as membrane type switches, such as described in U.S. Pat. No. 7,360,932, which is hereby incorporated herein by reference in its entirety, or such as detectors and the like, such as the types disclosed in U.S. Pat. Nos. 7,255,541; 6,504,531; 6,501,465; 6,492,980; 6,452,479; 6,437,258 and/or 6,369,804, which are hereby incorporated herein by reference in their entireties, and/or the like, while remaining within the spirit and scope of the present invention.

Optionally, the user inputs or buttons may comprise user inputs for a garage door opening system, such as a vehicle based garage door opening system of the types described in U.S. Pat. Nos. 6,396,408; 6,362,771; 7,023,322 and/or 5,798,688, which are hereby incorporated herein by reference in their entireties. Optionally, the user inputs may also or otherwise comprise user inputs for a telematics system of the vehicle, such as, for example, an ONSTAR® system as found in General Motors vehicles and/or such as described in U.S. Pat. Nos. 4,862,594; 4,937,945; 5,131,154; 5,255,442; 5,632,092; 5,798,688; 5,971,552; 5,924,212; 6,243,003; 6,278,377; 6,420,975; 6,477,464; 6,946,978; 7,308,341; 7,167,796; 7,004,593; 7,657,052 and/or 6,678,614, and/or U.S. Pat. Pub. No. US-2006-0050018, which are all hereby incorporated herein by reference in their entireties.

Optionally, the mirror assembly may include one or more other displays, such as the types disclosed in U.S. Pat. Nos. 5,530,240 and/or 6,329,925, which are hereby incorporated herein by reference in their entireties, and/or display-on-demand transflective type displays, and/or video displays or display screens, such as the types disclosed in U.S. Pat. Nos. 8,890,955; 7,855,755; 7,338,177; 7,274,501; 7,255,451; 7,195,381; 7,184,190; 7,046,448; 5,668,663; 5,724,187; 5,530,240; 6,329,925; 6,690,268; 7,734,392; 7,370,983; 6,902,284; 6,428,172; 6,420,975; 5,416,313; 5,285,060; 5,193,029 and/or 4,793,690, and/or in U.S. patent application Ser. No. 09/585,379, filed Jun. 1, 2000, now abandoned, and/or Ser. No. 10/207,291, filed Jul. 29, 2002, now abandoned, and/or U.S. Pat. Pub. Nos. US-2006-0061008; US-2006-0050018; US-2009-0015736; US-2009-0015736 and/or US-2010-0097469, and/or International Publication No. WO 2011/028686, which are all hereby incorporated herein by reference in their entireties.

Optionally, the mirror assembly may include one or more other accessories at or within the mirror casing, such as one or more electrical or electronic devices or accessories, such as antennas, including global positioning system (GPS) or cellular phone antennas, such as disclosed in U.S. Pat. No. 5,971,552, a communication module, such as disclosed in U.S. Pat. No. 5,798,688, a blind spot detection system, such as disclosed in U.S. Pat. Nos. 5,929,786 and/or 5,786,772, transmitters and/or receivers, such as a garage door opener or the like, a digital network, such as described in U.S. Pat. No. 5,798,575, a high/low headlamp controller, such as disclosed in U.S. Pat. Nos. 5,796,094 and/or 5,715,093, a memory mirror system, such as disclosed in U.S. Pat. No. 5,796,176, a hands-free phone attachment, a video device for internal cabin surveillance and/or video telephone function, such as disclosed in U.S. Pat. Nos. 5,760,962 and/or 5,877,897, a remote keyless entry receiver, lights, such as map reading lights or one or more other lights or illumination sources, such as disclosed in U.S. Pat. Nos. 6,690,268; 5,938,321; 5,813,745; 5,820,245; 5,673,994; 5,649,756; 5,178,448; 5,671,996; 4,646,210; 4,733,336; 4,807,096; 6,042,253; 5,669,698; 7,195,381; 6,971,775 and/or 7,249,860, microphones, such as disclosed in U.S. Pat. Nos. 7,657,052; 6,243,003; 6,278,377 and/or 6,420,975, speakers, antennas, including global positioning system (GPS) or cellular phone antennas, such as disclosed in U.S. Pat. No. 5,971,552, a communication module, such as disclosed in U.S. Pat. No. 5,798,688, a voice recorder, a blind spot detection system, such as disclosed in U.S. Pat. Nos. 7,720,580; 7,038,577; 6,882,287; 5,929,786 and/or 5,786,772, transmitters and/or receivers, such as for a garage door opener or a vehicle door unlocking system or the like (such as a remote keyless entry system), a digital network, such as described in U.S. Pat. No. 5,798,575, a high/low headlamp controller, such as a camera-based headlamp control, such as disclosed in U.S. Pat. Nos. 5,796,094 and/or 5,715,093, a memory mirror system, such as disclosed in U.S. Pat. No. 5,796,176, a hands-free phone attachment, an imaging system or components or circuitry or display thereof, such as an imaging and/or display system of the types described in U.S. Pat. Nos. 7,400,435; 7,526,103; 6,690,268 and/or 6,847,487, and/or U.S. Pat. Pub. No. US-2006-0125919, a video device for internal cabin surveillance (such as for sleep detection or driver drowsiness detection or the like) and/or video telephone function, such as disclosed in U.S. Pat. Nos. 5,760,962 and/or 5,877,897, a remote keyless entry receiver, a seat occupancy detector, a remote starter control, a yaw sensor, a clock, a carbon monoxide detector, status displays, such as displays that display a status of a door of the vehicle, a transmission selection (4wd/2wd or traction control (TCS) or the like), an antilock braking system, a road condition (that may warn the driver of icy road conditions) and/or the like, a trip computer, a tire pressure monitoring system (TPMS) receiver (such as described in U.S. Pat. Nos. 6,124,647; 6,294,989; 6,445,287; 6,472,979; 6,731,205 and/or 7,423,522), and/or an ONSTAR® system or the like.

Optionally, the accessory or accessories, such as those described above, may be positioned at or within the mirror casing and/or mirror cap portion or the like, and may be included on or integrated in a printed circuit board positioned within the mirror casing and/or cap portion, such as along a rear surface of the reflective element or elsewhere within a cavity defined by the casing, without affecting the scope of the present invention. The user actuatable inputs and/or touch sensors and/or proximity sensors and displays described above may be actuatable to control and/or adjust the accessories of the mirror assembly/system and/or overhead console and/or accessory module and/or vehicle. The connection or link between the controls and the display screen device and/or the navigation system and/or other systems and accessories of the mirror system may be provided via vehicle electronic or communication systems and the like, and may be connected via various protocols or nodes, such as BLUETOOTH®, SCP, UBP, J1850, CAN J2284, Fire Wire 1394, MOST, LIN, FlexRay™, Byte Flight and/or the like, or other vehicle-based or in-vehicle communication links or systems (such as Wi-Fi and/or IRDA) and/or the like, or via VHF or UHF or other wireless transmission formats, depending on the particular application of the mirror/accessory system and the vehicle. Optionally, the connections or links may be provided via various wireless connectivity or links, without affecting the scope of the present invention.

Changes and modifications in the specifically described embodiments may be carried out without departing from the principles of the present invention, which is intended to be limited only by the scope of the appended claims as interpreted according to the principles of patent law.

The invention claimed is:

1. A compass system for a vehicle, said compass system comprising:
    a compass sensor disposed at or near an interior heated surface of a windshield of a vehicle equipped with said compass system;
    wherein the interior heated surface has a heating element disposed thereat and wherein the heating element is heated by an electrically resistive material of the heating element passing an applied electric current when the heating element is powered;
    compass circuitry, wherein said compass circuitry, responsive to an output of said compass sensor indicative of sensed magnetic signals, is operable to determine a vehicle directional heading of the equipped vehicle;
    wherein said compass circuitry is operable to determine a magnetic signature generated by the heating element when the heating element is powered; and
    wherein said compass circuitry, responsive to a determination that the heating element is powered, is operable to compensate for the magnetic signature generated by the heating element to determine the vehicle directional heading, and wherein the compensation is derived from the determined magnetic signature.

2. The compass system of claim 1, wherein the magnetic signature generated by the heating element is determined periodically.

3. The compass system of claim 2, wherein, responsive to an input indicative of the heating element being powered, said compass circuitry determines a change in sensed magnetic signals and determines an amount of magnetic shift that the heating element generates when the heating element is powered, and wherein said compass circuitry compensates for the magnetic signature generated by the heating element by applying an offset derived from the determined amount of magnetic shift.

4. The compass system of claim 2, wherein, responsive to a determination of the magnetic signature generated by the heating element being affected by other factors, said compass circuitry uses a previously determined compensation.

5. The compass system of claim 4, wherein said other factors comprise at least one of (i) vehicle speed information and (ii) stability of sensed magnetic signals sensed by said compass sensor.

6. The compass system of claim 1, wherein said compass circuitry is operable to adjust the compensation to accommodate variances in current flow through the electrically resistive material of the heating element when the heating element is powered.

7. The compass system of claim 6, wherein said compass circuitry adjusts the compensation responsive, at least in part, to at least one of (i) current flow through the electrically resistive material of the heating element when the heating element is powered, (ii) vehicle battery voltage fluctuation when the heating element is powered, (iii) a temperature exterior of the equipped vehicle at or near the windshield and (iv) vehicle speed.

8. The compass system of claim 1, wherein said compass circuitry is operable to compensate for the magnetic signature generated by the heating element by applying an offset derived from the determined magnetic signature.

9. The compass system of claim 8, wherein said compass circuitry, responsive to the determination that the heating element is powered, is operable to apply said offset to one of (i) the output of said compass sensor and (ii) the determined vehicle directional heading of the equipped vehicle.

10. The compass system of claim 1, wherein said compass sensor is disposed at one of (i) an interior rearview mirror assembly disposed at and behind the interior heated surface of the windshield of the equipped vehicle and (ii) an accessory module disposed at and behind the interior heated surface of the windshield of the equipped vehicle.

11. The compass system of claim 1, wherein a camera views through the interior heated surface of the windshield, and wherein said compass sensor is disposed at or near said camera.

12. The compass system of claim 1, wherein the interior heated surface of the windshield comprises one of (i) a heated localized region at or near said compass sensor and (ii) substantially the entire surface of the windshield.

13. A compass system for a vehicle, said compass system comprising:
    a compass sensor disposed at or near an interior heated surface of a windshield of a vehicle equipped with said compass system;
    a camera disposed at and behind the interior heated surface of the windshield, wherein said camera views through the interior heated surface of the windshield, and wherein said compass sensor is disposed at or near said camera;
    wherein the interior heated surface has a heating element disposed thereat and wherein the heating element is heated by an electrically resistive material of the heating element passing an applied electric current when the heating element is powered;

compass circuitry, wherein said compass circuitry, responsive to an output of said compass sensor indicative of sensed magnetic signals, is operable to determine a vehicle directional heading of the equipped vehicle;

wherein said compass circuitry is operable to determine a magnetic signature generated by the heating element when the heating element is powered;

wherein said compass circuitry, responsive to a determination that the heating element is powered, is operable to compensate for the magnetic signature generated by the heating element to determine the vehicle directional heading; and wherein said compass circuitry is operable to compensate for the magnetic signature generated by the heating element by applying an offset derived from the determined magnetic signature.

14. The compass system of claim 13, wherein said compass circuitry, responsive to the determination that the heating element is powered, is operable to apply said offset to one of (i) the output of said compass sensor and (ii) the determined vehicle directional heading of the equipped vehicle.

15. The compass system of claim 13, wherein the magnetic signature generated by the heating element is determined periodically, and wherein, responsive to an input indicative of the heating element being powered, said compass circuitry determines a change in sensed magnetic signals and determines an amount of magnetic shift that the heating element generates when the heating element is powered, and wherein said compass circuitry compensates for the magnetic signature generated by the heating element by applying the offset derived from the determined amount of magnetic shift.

16. The compass system of claim 15, wherein, responsive to a determination of the magnetic signature generated by the heating element being affected by other factors, said compass circuitry uses a previously determined offset, and wherein said other factors comprise at least one of (i) vehicle speed information and (ii) stability of sensed magnetic signals sensed by said compass sensor.

17. The compass system of claim 15, wherein said compass circuitry is operable to adjust the offset to accommodate variances in current flow through the electrically resistive material of the heating element when the heating element is powered, wherein said compass circuitry adjusts the offset responsive, at least in part, to at least one of (i) current flow through the electrically resistive material of the heating element when the heating element is powered, (ii) vehicle battery voltage fluctuation when the heating element is powered, (iii) a temperature exterior of the equipped vehicle at or near the windshield and (iv) vehicle speed.

18. The compass system of claim 15, wherein the interior heated surface of the windshield comprises one of (i) a heated localized region through which said camera views and (ii) substantially the entire surface of the windshield.

19. A compass system for a vehicle, said compass system comprising:

a compass sensor disposed at or near an interior heated surface of a windshield of a vehicle equipped with said compass system;

wherein said compass sensor is disposed at one of (i) an interior rearview mirror assembly disposed at and behind the interior heated surface of the windshield of the equipped vehicle and (ii) an accessory module disposed at and behind the interior heated surface of the windshield of the equipped vehicle;

wherein the interior heated surface of the windshield comprises one of (i) a heated localized region at or near said compass sensor and (ii) substantially the entire surface of the windshield;

wherein the interior heated surface has a heating element disposed thereat and wherein the heating element is heated by an electrically resistive material of the heating element passing an applied electric current when the heating element is powered;

compass circuitry, wherein said compass circuitry, responsive to an output of said compass sensor indicative of sensed magnetic signals, is operable to determine a vehicle directional heading of the equipped vehicle;

wherein said compass circuitry is operable to determine a magnetic signature generated by the heating element when the heating element is powered;

wherein said compass circuitry, responsive to a determination that the heating element is powered, is operable to compensate for the magnetic signature generated by the heating element to determine the vehicle directional heading, and wherein the compensation is derived from the determined magnetic signature;

wherein said compass circuitry is operable to compensate for the magnetic signature generated by the heating element by applying an offset derived from the determined magnetic signature; and wherein said compass circuitry, responsive to the determination that the heating element is powered, is operable to apply said offset to one of (i) the output of said compass sensor and (ii) the determined vehicle directional heading of the equipped vehicle.

20. The compass system of claim 19, wherein said compass circuitry is operable to adjust the compensation to accommodate variances in current flow through the electrically resistive material of the heating element when the heating element is powered, and wherein said compass circuitry adjusts the compensation responsive, at least in part, to at least one of (i) current flow through the electrically resistive material of the heating element when the heating element is powered, (ii) vehicle battery voltage fluctuation when the heating element is powered, (iii) a temperature exterior of the equipped vehicle at or near the windshield and (iv) vehicle speed.

* * * * *